(12) United States Patent
Zhang et al.

(10) Patent No.: US 11,064,424 B2
(45) Date of Patent: Jul. 13, 2021

(54) SHARED SPECTRUM SYNCHRONIZATION DESIGN

(71) Applicant: QUALCOMM Incorporated, San Diego, CA (US)

(72) Inventors: Xiaoxia Zhang, San Diego, CA (US); Yongbin Wei, La Jolla, CA (US); Tamer Kadous, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/043,042

(22) Filed: Jul. 23, 2018

(65) Prior Publication Data

US 2019/0037481 A1 Jan. 31, 2019

Related U.S. Application Data

(60) Provisional application No. 62/536,903, filed on Jul. 25, 2017.

(51) Int. Cl.
*H04W 48/16* (2009.01)
*H04L 12/825* (2013.01)
(Continued)

(52) U.S. Cl.
CPC ......... *H04W 48/16* (2013.01); *H04J 11/0073* (2013.01); *H04J 11/0076* (2013.01); *H04L 5/0032* (2013.01); *H04L 5/0048* (2013.01); *H04L 5/0082* (2013.01); *H04L 5/0091* (2013.01); *H04L 27/26* (2013.01);
(Continued)

(58) Field of Classification Search
None
See application file for complete search history.

(56) References Cited

U.S. PATENT DOCUMENTS

2016/0056935 A1 2/2016 Damnjanovic et al.
2016/0142994 A1 5/2016 Luo et al.
(Continued)

FOREIGN PATENT DOCUMENTS

EP 3337252 A1 6/2018
WO 2017026434 A1 2/2017

OTHER PUBLICATIONS

International Search Report and Written Opinion—PCT/US2018/043503—ISA/EPO—dated Oct. 29, 2018.

*Primary Examiner* — Lonnie V Sweet
(74) *Attorney, Agent, or Firm* — Qualcomm Incorporated

(57) ABSTRACT

Methods, systems, and devices for wireless communication are described. A base station may perform a Listen-Before-Talk (LBT) procedure to obtain access to a wireless communication channel. The base station may then determine a pattern of synchronization signal block (SSB) transmissions based on an outcome of the LBT procedure and transmit the pattern of SSB transmissions after obtaining access to the wireless communication channel. The outcome of the LBT procedure may include obtaining access to the wireless communication channel after a missed opportunity for at least one SSB transmission in a discovery reference signal (DRS) measurement timing configuration (DMTC) window. A user equipment (UE) may determine system timing based on a received SSB transmission.

30 Claims, 13 Drawing Sheets

(51) Int. Cl.
*H04L 5/00* (2006.01)
*H04W 56/00* (2009.01)
*H04W 16/14* (2009.01)
*H04L 5/14* (2006.01)
*H04J 11/00* (2006.01)
*H04L 27/26* (2006.01)
*H04W 74/08* (2009.01)

(52) U.S. Cl.
CPC ....... *H04W 16/14* (2013.01); *H04W 56/0015* (2013.01); *H04L 5/0023* (2013.01); *H04L 5/14* (2013.01); *H04W 74/0808* (2013.01)

(56) References Cited

U.S. PATENT DOCUMENTS

| | | | | |
|---|---|---|---|---|
| 2016/0330678 | A1* | 11/2016 | Yoon | H04W 48/12 |
| 2018/0242183 | A1* | 8/2018 | Bergstrom | H04L 5/001 |
| 2018/0331774 | A1* | 11/2018 | Ye | H04J 11/0069 |
| 2018/0359683 | A1* | 12/2018 | Rosa | H04W 48/12 |
| 2019/0013984 | A1* | 1/2019 | Liang | H04L 5/00 |
| 2019/0074941 | A1* | 3/2019 | Hwang | H04B 1/7156 |
| 2019/0075596 | A1* | 3/2019 | Ye | H04L 5/0035 |
| 2019/0312686 | A1* | 10/2019 | Harada | H04W 72/0413 |
| 2020/0053738 | A1* | 2/2020 | Harada | H04W 56/0005 |
| 2020/0145981 | A1* | 5/2020 | Harada | H04L 5/0025 |

* cited by examiner

SHARED SPECTRUM SYNCHRONIZATION DESIGN

CLAIM OF PRIORITY UNDER 35 U.S.C. § 119

The present Application for Patent claims priority to Provisional Application No. 62/536,903 entitled "SHARED SPECTRUM SYNCHRONIZATION DESIGN" filed Jul. 25, 2017 and assigned to the assignee hereof and hereby expressly incorporated by reference herein.

BACKGROUND

Aspects of the present disclosure relate to cell synchronization procedures and wireless communication systems.

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

SUMMARY

A base station may perform a Listen-Before-Talk (LBT) procedure to obtain access to a wireless communication channel. The base station may then determine a pattern of synchronization signal block (SSB) transmissions based on an outcome of the LBT procedure and transmit the pattern of SSB transmissions after obtaining access to the wireless communication channel. The outcome of the LBT procedure may include obtaining access to the wireless communication channel after a missed opportunity for at least one SSB transmission in a discovery reference signal (DRS) measurement timing configuration (DMTC) window. A user equipment (UE) may determine system timing based on a received SSB transmission.

A method of wireless communication is described. The method may include performing a Listen-Before-Talk (LBT) procedure to obtain access to a wireless communication channel, determining a pattern of synchronization signal block (SSB) transmissions based on an outcome of the LBT procedure, and transmitting the pattern of SSB transmissions after obtaining access to the wireless communication channel.

An apparatus for wireless communication is described. The apparatus may include a processor, memory in electronic communication with the processor, and instructions stored in the memory and operable, when executed by the processor, to cause the apparatus to perform a Listen-Before-Talk (LBT) procedure to obtain access to a wireless communication channel, determine a pattern of synchronization signal block (SSB) transmissions based on an outcome of the LBT procedure, and transmit the pattern of SSB transmissions after obtaining access to the wireless communication channel.

A non-transitory computer-readable medium storing code for wireless communication is described. The code may include instructions executable to perform a Listen-Before-Talk (LBT) procedure to obtain access to a wireless communication channel, determine a pattern of synchronization signal block (SSB) transmissions based on an outcome of the LBT procedure, and transmit the pattern of SSB transmissions after obtaining access to the wireless communication channel.

An apparatus for wireless communication is described. The apparatus may include means for performing a Listen-Before-Talk (LBT) procedure to obtain access to a wireless communication channel, means for determining a pattern of synchronization signal block (SSB) transmissions based on an outcome of the LBT procedure, and means for transmitting the pattern of SSB transmissions after obtaining access to the wireless communication channel.

In some examples of the method, apparatuses, or non-transitory computer-readable medium described herein, the outcome of the LBT procedure includes obtaining access to the wireless communication channel after a missed opportunity for at least one SSB transmission in a discovery reference signal (DRS) measurement timing configuration (DMTC) window. In some cases, the determining the pattern includes dropping the at least one SSB transmission from the pattern. In some cases, the pattern includes at least one SSB transmission of at least one remaining opportunity for SSB transmissions in the DMTC window.

In some examples of the method, apparatuses, or non-transitory computer-readable medium described herein, the pattern includes the at least one SSB transmission associated with the missed opportunity after an SSB transmission of at least one remaining opportunity for SSB transmissions in the DMTC window. Some examples of the method, apparatuses, or non-transitory computer-readable medium described herein may further include processes, features, means, or instructions for transmitting a wrap around index to a user equipment (UE). In some cases, the wrap around index is transmitted in a Physical Broadcast Channel (PBCH). In some cases, the wrap around index is transmitted in unused resource elements of at least one symbol on which a primary synchronization signal (PSS) or secondary synchronization signal (SSS) is transmitted.

In some examples of the method, apparatuses, or non-transitory computer-readable medium described herein, the transmitting includes transmitting SSB transmissions according to the pattern at a first available SSB transmission opportunity after the missed opportunity. Some examples of the method, apparatuses, or non-transitory computer-readable medium described herein may further include processes, features, means, or instructions for transmitting a timing offset to a user equipment (UE). In some cases, the timing offset indicates the timing offset between the first available SSB transmission opportunity and a starting boundary of the DMTC window. In some cases, the timing offset is transmitted in a Physical Broadcast Channel (PBCH). In some cases, the timing offset is transmitted in unused resource elements of at least one symbol on which a primary synchronization signal (PSS) or secondary synchronization signal (SSS) is transmitted.

A method of wireless communication is described. The method may include receiving at least one synchronization signal block (SSB) transmission from a base station, and determining a system timing based on the at least one SSB transmission.

An apparatus for wireless communication is described. The apparatus may include a processor, memory in electronic communication with the processor, and instructions stored in the memory and operable, when executed by the processor, to cause the apparatus to receive at least one synchronization signal block (SSB) transmission from a base station, and determine a system timing based on the at least one SSB transmission.

A non-transitory computer-readable medium storing code for wireless communication is described. The code may include instructions executable to receive at least one synchronization signal block (SSB) transmission from a base station, and determine a system timing based on the at least one SSB transmission.

An apparatus for wireless communication is described. The apparatus may include means for receiving at least one synchronization signal block (SSB) transmission from a base station and means for determining a system timing based on the at least one SSB transmission.

Some examples of the method, apparatuses, or non-transitory computer-readable medium described herein, may further include processes, features, means, or instructions for receiving a wrap around index from the base station and determining the system timing based on the wrap around index in addition to the received at least one SSB transmission. Some examples of the method, apparatuses, or non-transitory computer-readable medium described herein, may further include processes, features, means, or instructions for receiving a timing offset from the base station and determining the system timing based on the timing offset in addition to the received at least one SSB transmission.

A method of wireless communication is described. The method may include determining unused resource elements of at least one symbol on which a primary synchronization signal (PSS) or secondary synchronization signal (SSS) is transmitted and transmitting information on the unused resource elements. In some cases, the information transmitted on the unused resource elements includes a timing offset or wrap around index.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
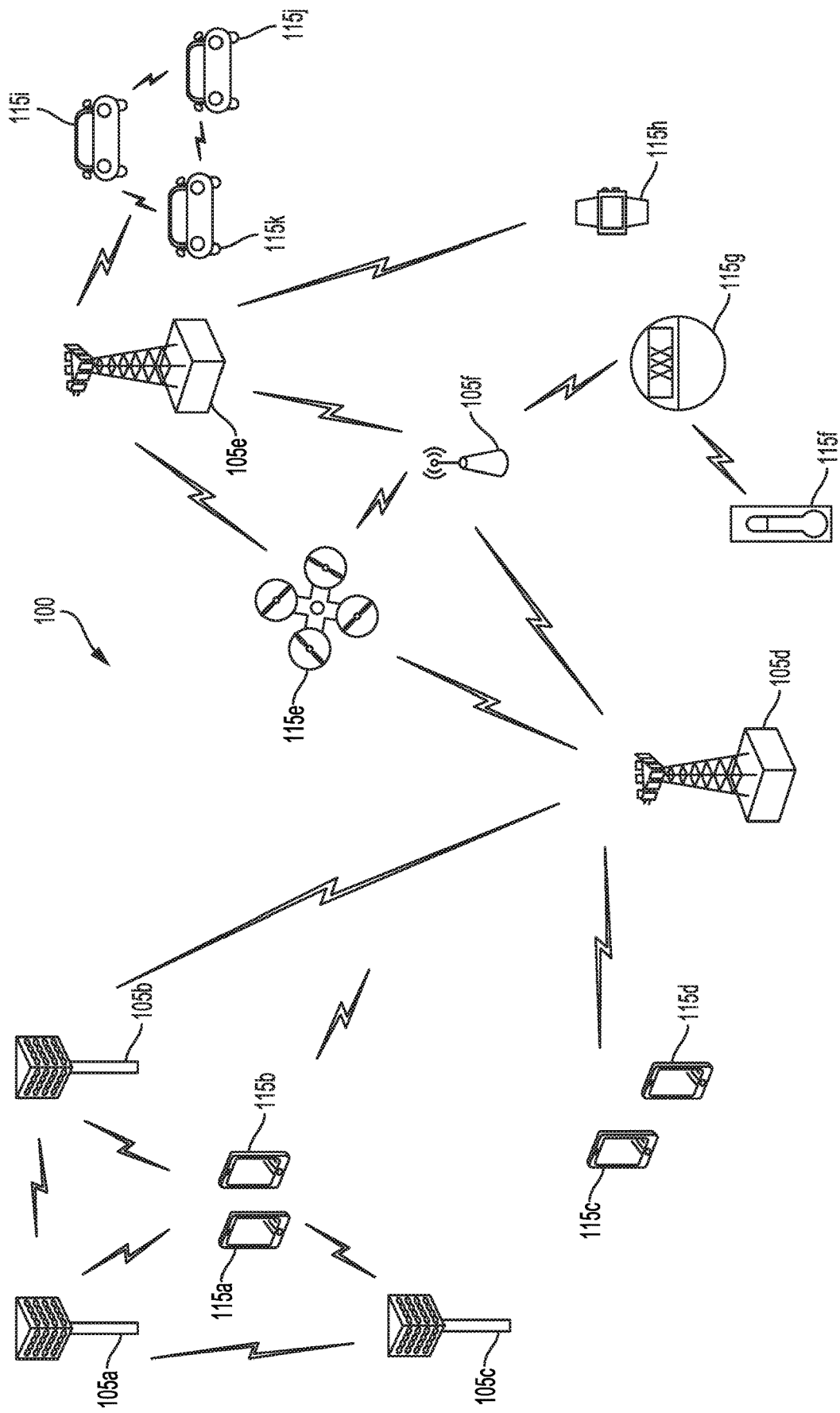
FIG. 1 is a block diagram illustrating details of a wireless communication system.

A cell search procedure in wireless cellular communication systems allows devices to acquire cell and synchronization information. The cell search procedure may involve the broadcasting of certain physical signals in each cell. In some instances, a base station transmits a primary synchronization signal (PSS) and a secondary synchronization signal (SSS) to facilitate cell search and acquisition. The detection and processing of the PSS and SSS by a user equipment (UE) may enable time and frequency synchronization as well as provide the physical layer identity of the cell to the UE, in addition to other initial access information.

In certain configurations, such as in a new radio (NR) configuration, a base station may transmit a synchronization signal block (SSB) comprising a PSS and SSS multiplexed with a physical broadcast channel (PBCH). The base station may transmit an SSB burst, comprising multiple and repeated SSB transmissions within a particular time frame to facilitate coverage enhancement or a beam sweeping procedure of transmitting synchronization signals to UEs in different locations.

The time frame within which the number of SSB transmissions are sent may be a discovery reference signal (DRS) measurement timing configuration (DMTC) window. The DMTC window may be a time frame within which the UE may measure DRS for a cell, including synchronization signals, cell specific reference signals, a master information block (MIB) and other signaling useful for identifying or attaching to a cell.

In some instances, the number of SSB transmissions within the DMTC window may be limited based on factors such as the subcarrier spacing used by the system or frequency band in which the base station operates. For example, in current NR (5G new radio) agreement, if the system operates in a frequency band below 3 GHz, the base station may be limited to a maximum of four SSB transmissions within a 5 ms time frame. In another example, if the system operates in a frequency band between 3 and 6 GHz, the base station may be limited to a maximum of eight SSB transmissions within a 5 ms time frame. In yet another example, if the system operates in a frequency band above 6 GHz, the base station may be limited to a maximum of sixty-four SSB transmissions within a 5 ms time frame.

The limitation on the number of SSB transmissions and the pattern of SSB transmissions within the DMTC window may be predefined. Accordingly, each SSB transmission may also be associated with a SSB index that is broadcast to the UE (e.g., using PBCH). The SSB index allows the UE to determine which particular SSB transmission of a predefined pattern of SSB transmissions is currently being received at the UE. For example, in an implementation in which there are a maximum of four SSB transmissions within the DMTC window, each of the SSB transmissions may be associated with a different SSB index (e.g., SSB0, SSB1, SSB2, and SSB3).

In a licensed frequency band, a UE may acquire system timing based on receiving the SSB transmissions along with the SSB index. In an unlicensed or shared frequency band, however, a base station may not always have access to the communication medium, and so it may not be able to transmit an SSB transmission at the first predefined opportunity for an SSB transmission within a particular time frame (e.g., at slot 0 of a DMTC window). In some instances, the base station first performs a channel contention procedure, such as Listen Before Talk (LBT), before it is able to obtain channel access and begin SSB transmissions. Accordingly, a base station may miss one or more opportunities to transmit SSBs, which may result in inefficient system synchronizations operations at the UE.

In some instances, if a base station obtains channel access via an LBT procedure after at least one SSB transmission opportunity has passed, the base station may ignore the missed SSB transmissions and not attempt to retransmit them. In other instances, the base station may first transmit remaining SSB transmissions within the DMTC window according to a predefined pattern and then any of the missed SSB transmissions. Alternatively, the base station may transmit the SSB transmissions in accordance with the original predefined pattern at the earliest available opportunity upon obtaining access to the medium. Accordingly, these options allow a base station to increase the possible SSB transmissions in the event that the base station misses one or more opportunities to transmit SSB transmissions according to a predefined pattern, as may often occur in an unlicensed or shared spectrum environment.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105*d* and 105*e* are regular macro eNBs, while eNBs 105*a*-105*c* are macro eNBs enabled with one of 3 dimension (3D), full dimension (FD), or massive MIMO. eNBs 105*a*-105*c* take advantage of their higher dimension MIMO capabilities to exploit 3D beamforming in both elevation and azimuth beamforming to increase coverage and capacity. eNB 105*f* is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

The communication links depicted in FIG. 1 may include communication links in licensed, unlicensed, or shared radio frequency (RF) spectrum. In some instances, a shared spectrum band may refer to spectrum that is lightly licensed and/or in which there may be some level of coordination among communications of different radio access technologies (RATs) or some level of preference given to communications of a particular RAT, such as an incumbent RAT, for example. In other instances, a shared spectrum band may generally refer to spectrum in which different RATs coexist or operate within the same RF spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes. Accordingly, the terms shared spectrum and unlicensed spectrum are used interchangeably herein unless otherwise noted.

In operation at 5G network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also supports mission critical communications with ultra-reliable and redundant links for mission critical devices, such UE 115e, which is a drone in the example depicted in FIG. 1. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through 5G network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. 5G network 100 may also provide additional network efficiency through dynamic, low-latency TDD/FDD communications, such as in a vehicle-to-vehicle (V2V) mesh network between UEs 115i-115k communicating with macro eNB 105e.

One or more of the base stations 105 may transmit synchronization signals, among other signals, in a cell search procedure enabling UEs 115 to acquire cell and system timing information. Base station 105 may transmit the synchronization signals in the form of a synchronization signal block (SSB), including multiple SSB transmissions within a particular time frame, such as a DMTC window or 5 ms window. In a shared spectrum frequency band, the base station 105 may not obtain channel access at a first available opportunity for SSB transmission (e.g., slot 0 of a DMTC window) and may miss one or more opportunities for SSB transmission. The base station 105 may transmit SSB transmissions in remaining SSB opportunities without transmitting the SSB transmissions of the missed opportunities. In other instances, the base station 105 may transmit SSB from the missed opportunities either after transmission of remaining SSB opportunities of the current DMTC window, or at the earliest available opportunity according to a predefined pattern once the base station 105 obtains channel access. In some situations, the base station 105 may transmit additional signaling to the UEs 115 to facilitate cell synchronization in a shared spectrum environment and to account for the possible operations of the base station 105 described above.

Figure 2:
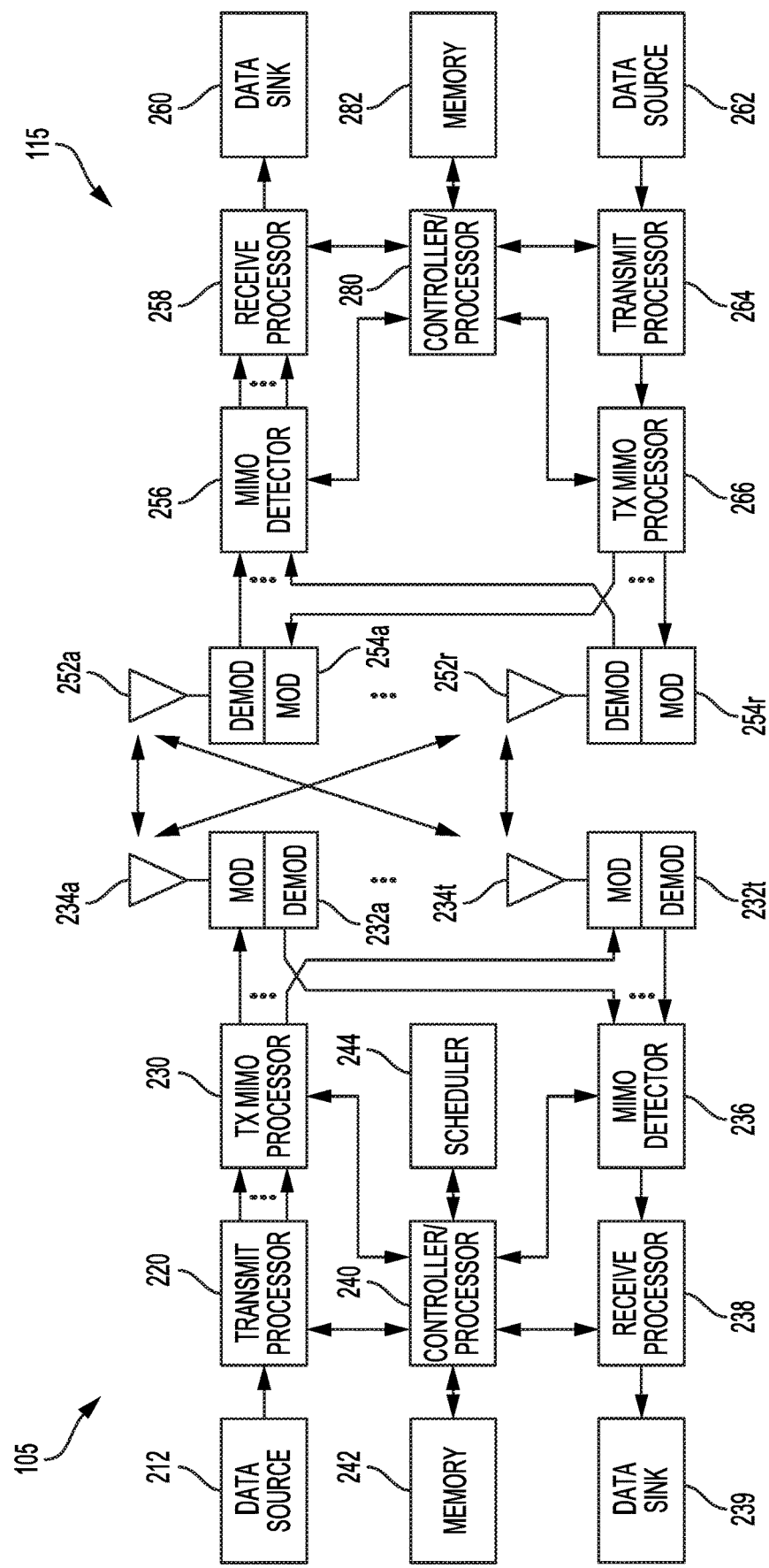
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for various control channels such as the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 7, and/or other processes for the techniques described herein. The memories 242 and 282 may store data and program codes for the eNB 105 and the UE 115, respectively. For example, memory 242 may store instructions that, when performed by the processor 240 or other processors depicted in FIG. 2, cause the base station 105 to perform operations described with respect to FIGS. 11 and 13. Similarly, memory 282 may store instructions that, when performed by processor 280 or other processors depicted in FIG. 2, cause the UE 115 to perform operations described with respect to FIG. 12. A scheduler 244 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 220, the receive processor 238, or the TX MIMO processor 230 may be performed by or under the control of processor 240.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in inefficient cell synchronization.

Figure 3:
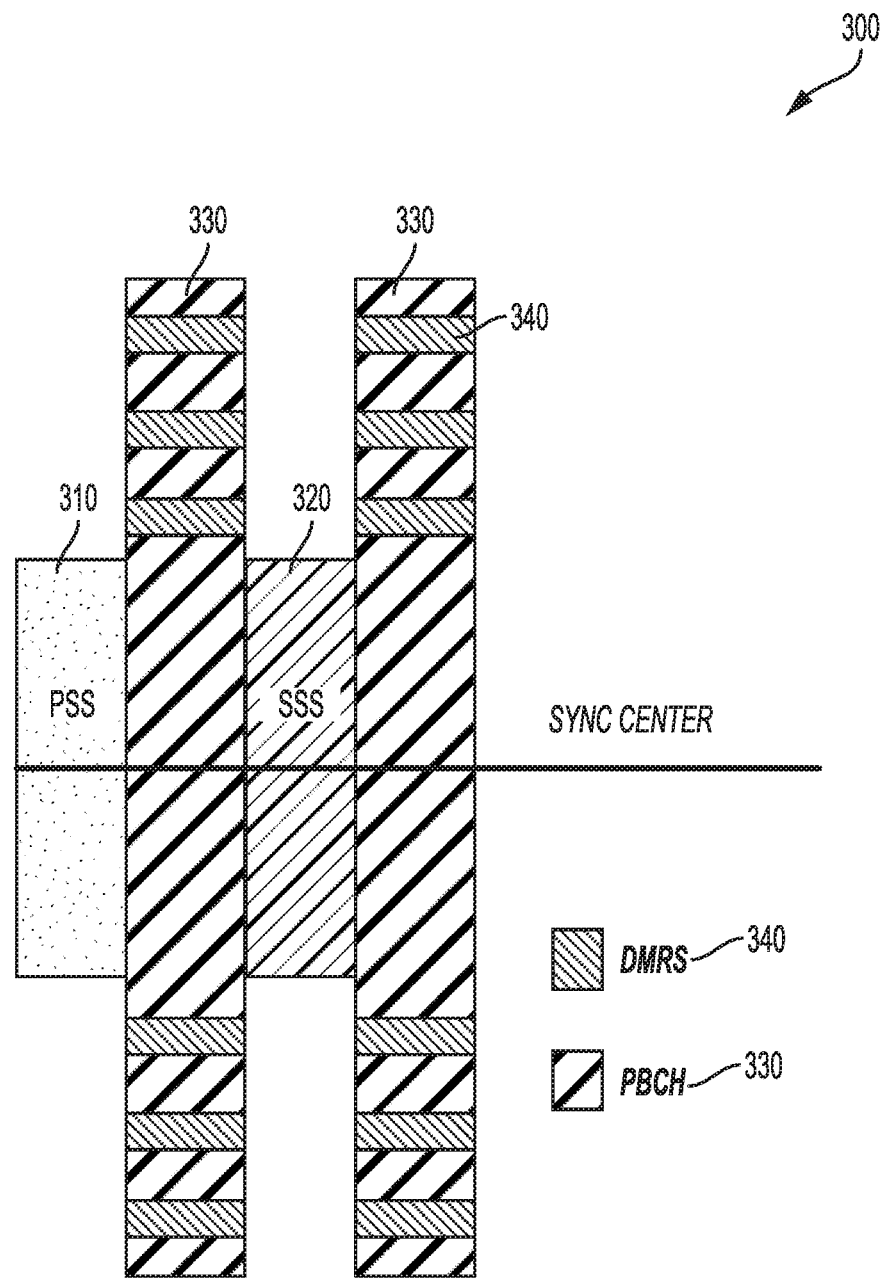
FIG. 3 illustrates an example of a synchronization signal block (SSB) structure.

In 5G network 100, cell synchronization procedures may involve base station 105 broadcasting a set of signals in a synchronization signal block (SSB) to facilitate cell search and synchronization by UEs 115. FIG. 3 illustrates an example of the structure of a SSB 300 broadcasted by base station 105. The configuration of SSB 300 includes a PSS 310, a SSS 320, and PBCH 330 multiplexed between the PSS 310 and SSS 320 as shown in FIG. 3. The PBCH 330 may include reference signals such as demodulation reference signals (DMRS) signals 340. Accordingly, each SSB 300 transmitted by base station 105 may help the UE 115 determine system timing information such as a symbol timing based on PSS 310, cell identification based on PSS 310 and SSS 320, and other parameters needed for initial cell access based on a Master Information Block (MIB) sent in the PBCH 330.

In some implementations, the PSS 310 and SSS 320 each occupy one symbol in the time domain, while the PBCH 330 occupies two symbols but is split into two parts with a first half in one symbol between the PSS 310 and SSS 320, and a second half in a second symbol after SSS 320, as seen in FIG. 3. In the frequency domain, the PSS 310 and SSS 320 may each occupy 127 resource elements or subcarriers, while the PBCH 330 may occupy 288 resource elements. The frequency location of the SSB 300 may not necessarily be in the center 6 resource blocks of the frequency band but may vary depending on the sync raster and may be a function of channel raster parameters.

Base station 105 may periodically transmit an SSB 300 to allow UEs 115 the opportunity to synchronize with the system. In 5G networks, however, the base station 105 may transmit multiple instances of SSBs in a synchronization burst, instead of, for example, only one instance of PSS and SSS every 5 ms. In a synchronization burst, multiple SSB transmissions may be sent within a 5 ms time window. The multiple SSB transmissions may allow for coverage enhancements and/or directional beams to UEs in different locations. The base station 105, however, may be limited by predefined rules in the number of SSBs and the corresponding locations of the SSBs it can transmit within a particular time frame. The limitations may be based on various factors, including the particular subcarrier spacing used by the system and the frequency band in which the system operates.

Figure 4:
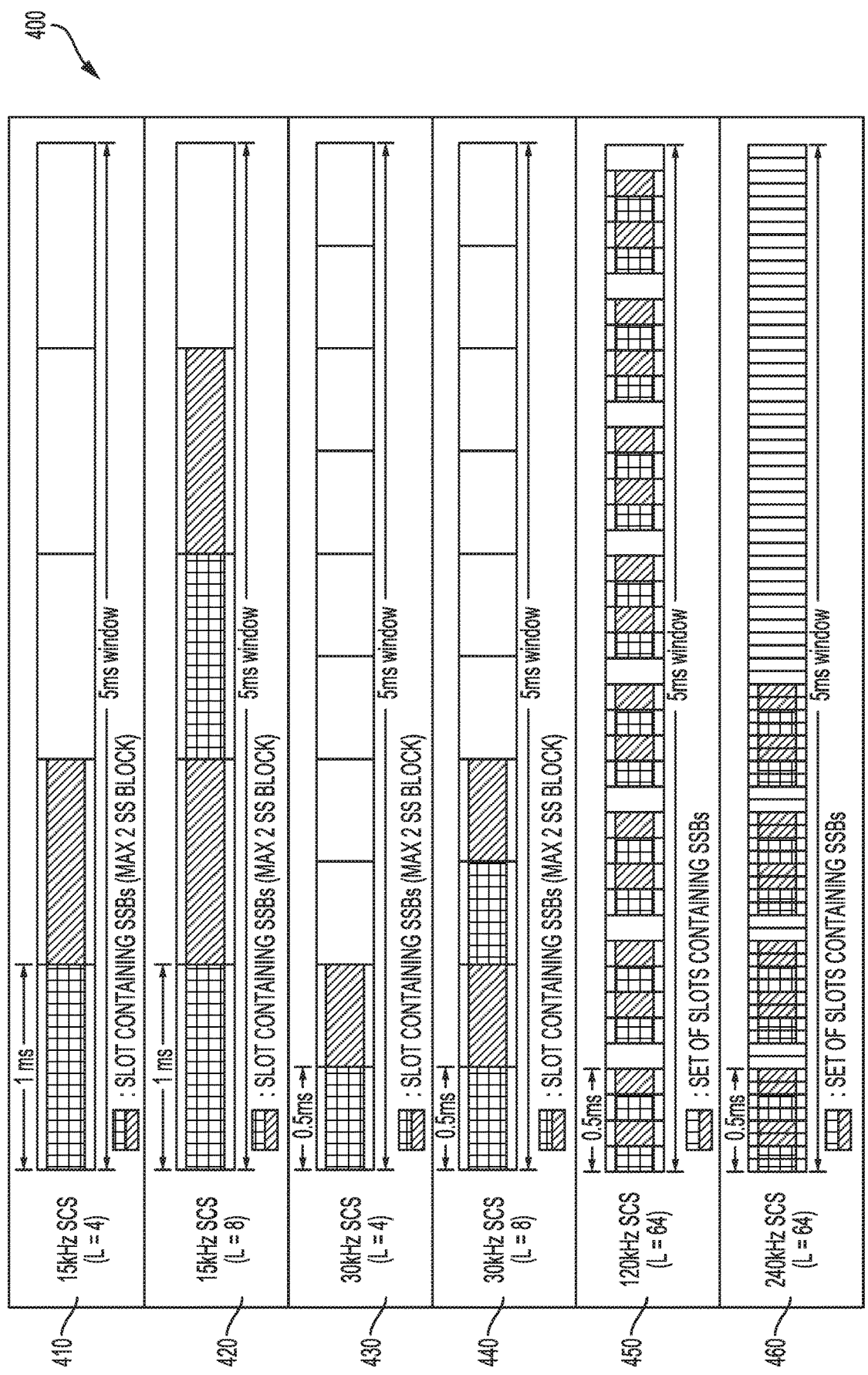
FIG. 4 illustrates example configurations of patterns of SSB transmission opportunities based on various system parameters.

FIG. 4 illustrates example configurations 400 of patterns of SSB transmission opportunities based on various system parameters. As shown in FIG. 4, the number of SSB transmission opportunities and their corresponding locations that a base station 105 has within a DMTC window (e.g., 5 ms window) may depend on the subcarrier spacing employed by the system and the frequency band in which the system operates. The UE may measure cell DRS according to periodically configured discovery reference signal (DRS) measurement timing configuration (DMTC) periods window. The DMTC may be configured for measurements of a serving cell or neighbor cells, or both. Further, the DMTC may be frequency specific or may be applicable to multiple frequencies in various examples. The length of a slot in each configuration may vary depending on the subcarrier spacing used in the configuration. In configuration 410, a subcarrier spacing of 15 kHz is used within a sub 3 GHz frequency band (e.g., 2.4 GHz frequency band). Within a 5 ms window, the base station 105 in this configuration 410 may be allowed to transmit four SSBs within the first 2 ms. Based on this restriction, base station 105 may transmit up to four SSBs in the first two slots. Fewer SSBs may be transmitted depending on the implementation, but no more than four SSBs may be transmitted in this example configuration 410.

Other example configurations are depicted in FIG. 4 in which the SSB opportunities available are based on the subcarrier spacing and frequency band of the system. In configuration 420, a subcarrier spacing of 15 kHz is used within a frequency band between 3 and 6 GHz (e.g., 3.5 GHz, 5 GHz), and the maximum number of SSB transmissions is eight, which may be required to be transmitted within the first four slots (i.e., first 4 ms) of the DMTC window, with a maximum of two SSB per slot. In configuration 430, a subcarrier spacing of 30 kHz is used within a sub 3 GHz frequency band (e.g., 2.4 GHz), and the maximum number of SSB transmissions is four, which may be required to be transmitted within the first two slots (i.e., first 1 ms) of the DMTC window, with a maximum of two SSB per slot. In configuration 440, a subcarrier spacing of 30 kHz is used within a frequency band between 3 and 6 GHz (e.g., 3.5 GHz, 5 GHz), and the maximum number of SSB transmissions is eight, which may be required to be transmitted within the first four slots (i.e., first 2 ms) of the DMTC window, with a maximum of two SSB per slot. In configuration 450, a subcarrier spacing of 120 kHz is used within a frequency band of over 6 GHz (e.g., 60 GHz), and the maximum number of SSB transmissions is 64, which may be required to be transmitted according to the pattern depicted in FIG. 4. In configuration 460, a subcarrier spacing of 240 kHz is used within a frequency band of over 6 GHz (e.g., 60 GHz), and the maximum number of SSB transmissions is 64, which may be required to be transmitted according to the pattern depicted in FIG. 4.

Figure 5A:
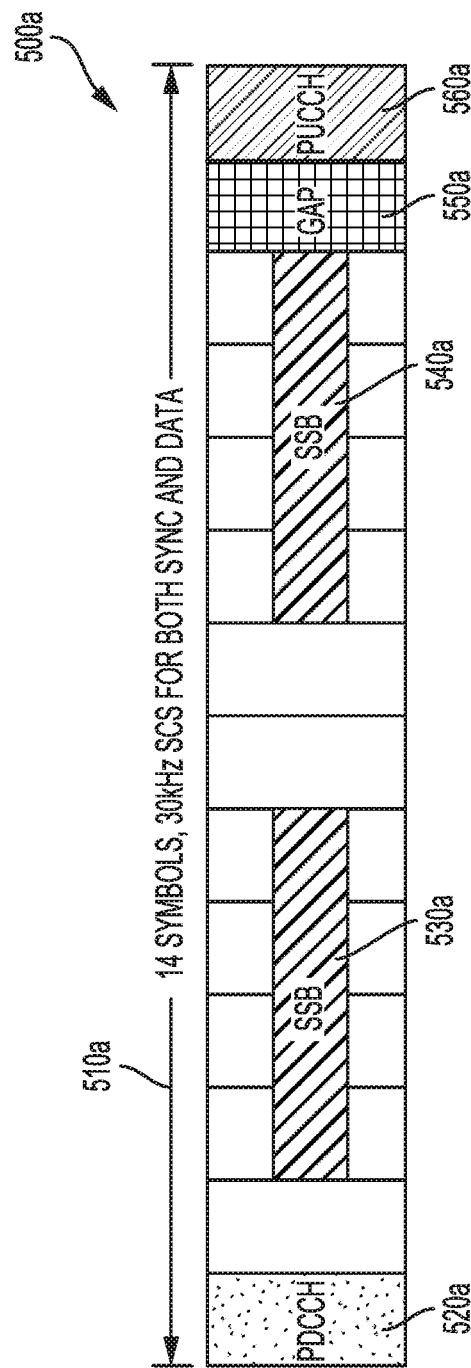
FIGS. 5A and 5B illustrate further details regarding example patterns of resources allocated for SSB transmission opportunities based on various system parameters.
Figure 5B:
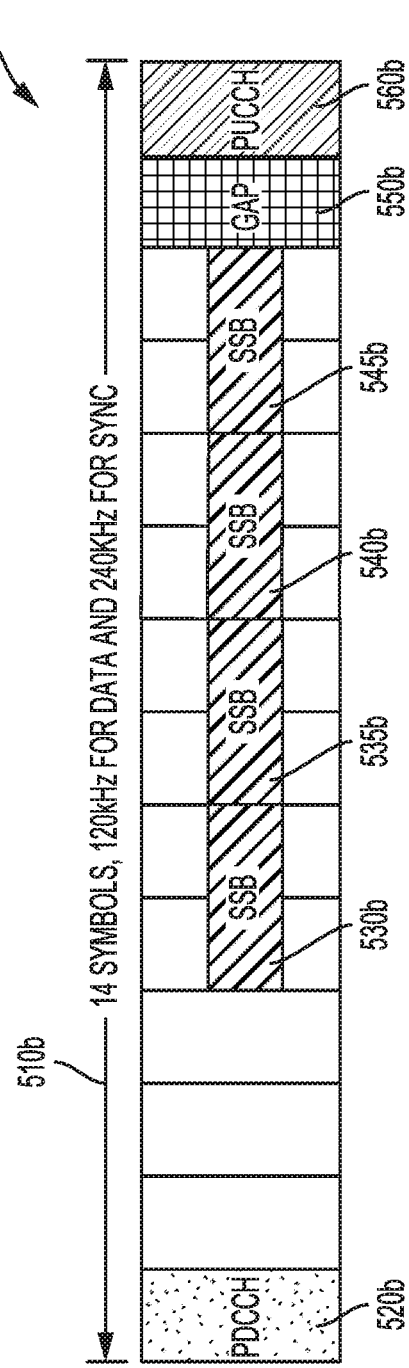

FIGS. 5A and 5B illustrate further details regarding example patterns 500a and 500b of resources allocated for SSB transmission opportunities based on various system parameters. In FIG. 5A, a configuration of 30 kHz subcarrier spacing is used by the raster for both synchronization signals as well as data. The pattern 500a depicted in FIG. 5A may be applicable to operation in a sub-6 GHz frequency band (e.g., 2.4 GHz, 3.5 GHz, or 5 GHz). In this configuration, each slot has a duration of 0.5 ms, and the example slot 510a is further divided into 14 symbols. In the depicted example, a first symbol is used for transmission of PDCCH 520a, and two SSB transmission opportunities 530a and 540a occur beginning at the third and ninth symbols of the slot 510a. One symbol may be reserved as a gap 550a with no transmissions to allow a UE to switch its radio from downlink reception to uplink transmission. A final symbol may be used for uplink control signals in PUCCH 560a. The pattern 500a may represent a predefined pattern for SSB transmission opportunities 530a and 540a that defines the specific resources that the base station 105 uses to transmit SSBs during slot 510a if the base station 105 determines to transmit the maximum allowed SSBs for this time slot 510a. The base station 105 may determine to transmit no SSBs or fewer than two SSBs during slot 510a.

FIG. 5B depicts another example pattern of resources allocated for SSB transmission opportunities based on different system parameters. The pattern 500b depicted in FIG. 5B may be applicable to operation in a frequency band greater than 6 GHz (e.g., 60 GHz). In this configuration, each slot has a duration of 0.125 ms, and the example slot 510b is further divided into 14 symbols. In the depicted example, the data subcarrier spacing is 120 kHz but the synchronization signal subcarrier spacing is 240 kHz. In this configuration, a first symbol may be used for transmission of PDCCH 520b, a gap 550b in the thirteenth symbol, and a final symbol used for PUCCH 560b. There may be four SSB transmission opportunities in this configuration, beginning at the fifth symbol of slot 510b. Although as depicted, the SSB transmissions span only two symbols with respect to the data raster (120 kHz), each SSB in this example still comprises 4 symbols with respect to the synchronization raster (240 kHz). The pattern 500b may represent a predefined pattern for SSB transmission opportunities 530b, 535b, 540b, and 545b that defines the specific resources that the base station 105 uses to transmit SSBs during slot 510b if the base station 105 determines to transmit the maximum allowed SSBs for this time slot 510b. The base station 105 may determine to transmit no SSBs or fewer than 4 SSBs during slot 510b.

FIGS. 5A and 5B depict two example patterns of resource allocation for SSB transmission opportunities. Other patterns are also possible and within the scope of the present disclosure.

In an operating environment in which the base station 105 has continuous access to the communication medium, such as in licensed spectrum operation, the base station 105 will follow the designated pattern associated with the system parameters for each SSB transmission. In an operating environment in which the base station 105 may not have continuous access to the communication medium, however, such as in shared spectrum operation, the base station 105 may not be able to follow the designated pattern for each SSB transmission because it may be unable to obtain channel access until after one or more SSB transmission opportunities within a DMTC window has passed. In other words, the base station 105 may only obtain channel access after a successful channel contention procedure such as LBT, and therefore may not be able to transmit an SSB at the first available opportunity (e.g., at slot 0) of a DMTC window. Other channel contention procedures may be used as well. Accordingly, the base station 105 may follow certain procedures as described below to maintain, to the extent possible, the number of SSB transmissions within a synchronization burst even in shared spectrum operation.

Figure 6:
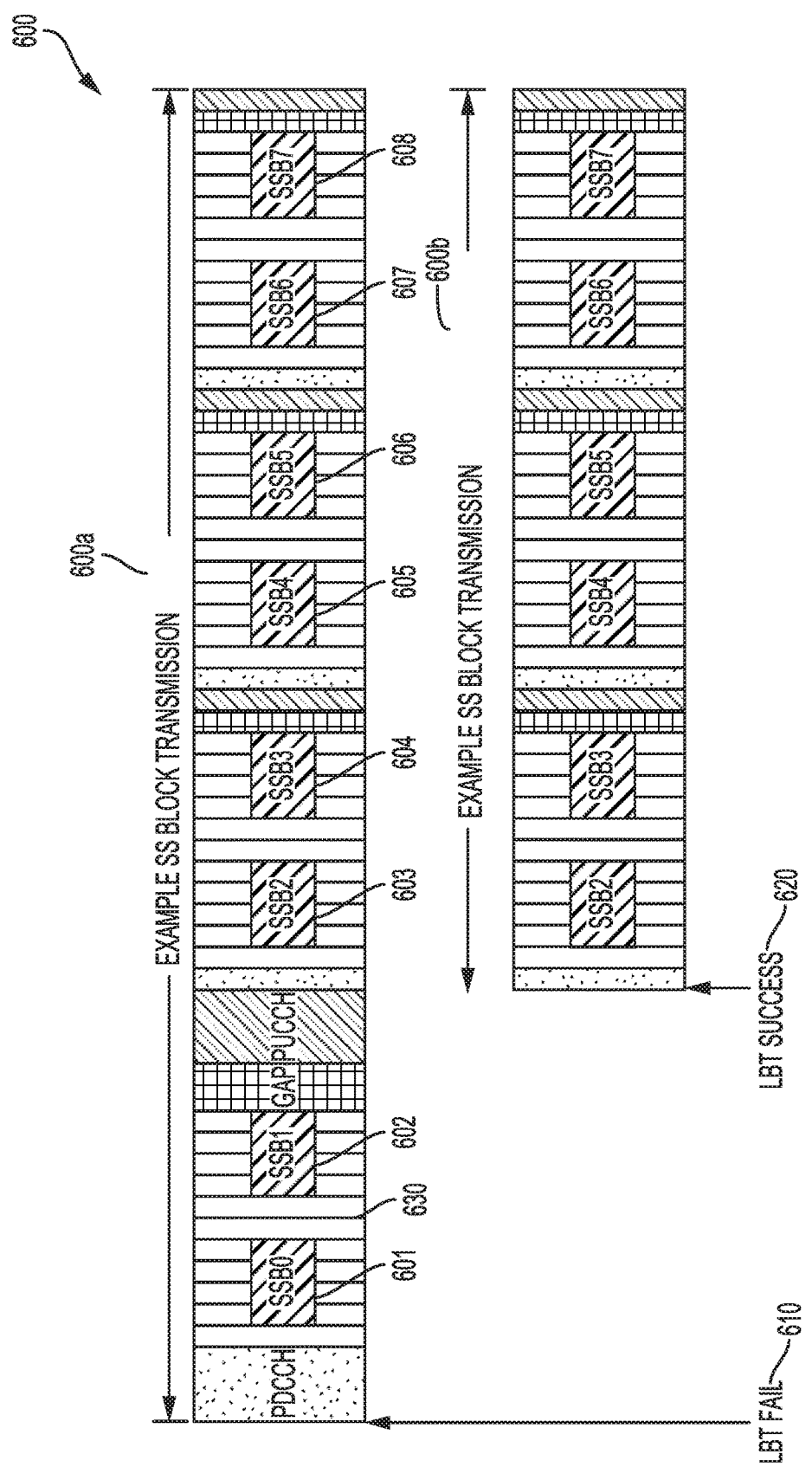
FIG. 6 illustrates an example SSB transmission pattern for SSB transmissions in a shared spectrum environment.

FIG. 6 illustrates an example SSB transmission pattern 600 used by the base station 105 for SSB transmissions in a shared spectrum environment. In the illustrated example, the system configuration may correspond to configuration 440 of FIG. 4, in which a subcarrier spacing of 30 kHz is used in a frequency band between 3 GHz and 6 GHz, resulting in a SSB transmission pattern 600a as seen in FIG. 6. In the illustrated example, however, base station 105 operates in a shared spectrum environment and initially fails an LBT procedure 610 at slot 0 of the transmission pattern 600a. The base station 105 then succeeds in the LBT procedure 620 at the next slot of the transmission pattern 600a. At this point in time, slot 0 has been missed, and accordingly, two SSB transmission opportunities 601 and 602 have been missed. In this instance, base station 105 transmits SSBs in the remaining opportunities 603, 604, 605, 606, 607, and 608 of the DMTC window according to pattern 600*b*. The transmitted pattern 600*b* corresponds to the original predefined pattern 600*a* except that the first two SSB transmissions 601 and 602 are not sent due to the initial LBT failure 610.

In this example, the predefined pattern 600*a* is reused, and no additional signaling is needed for the UE 115 to acquire system timing. In addition to obtaining symbol timing, cell ID, and initial access parameters from PSS, SSS, and PBCH in a SSB, each SSB transmission is also associated with an SSB index (e.g., SSB0, SSB1, etc.). Accordingly, the UE 115 can also determine the DMTC window timing based on the SSB index as well as the knowledge that base station 105 will not retransmit SSB transmissions 601 and 602 that have been missed.

Although FIG. 6 depicts an example of two missed SSB transmission opportunities 601 and 602, the base station 105 may apply the same procedures discussed above with respect to any number of missed SSB transmission opportunities. The base station 105 may also obtain channel access and begin transmitting SSBs in the middle of a slot (i.e., not at a slot boundary). For example, the base station 105 may miss a first SSB transmission opportunity 601 but obtain channel access in time to transmit at the second SSB transmission opportunity 602 in the same slot.

Figure 7:
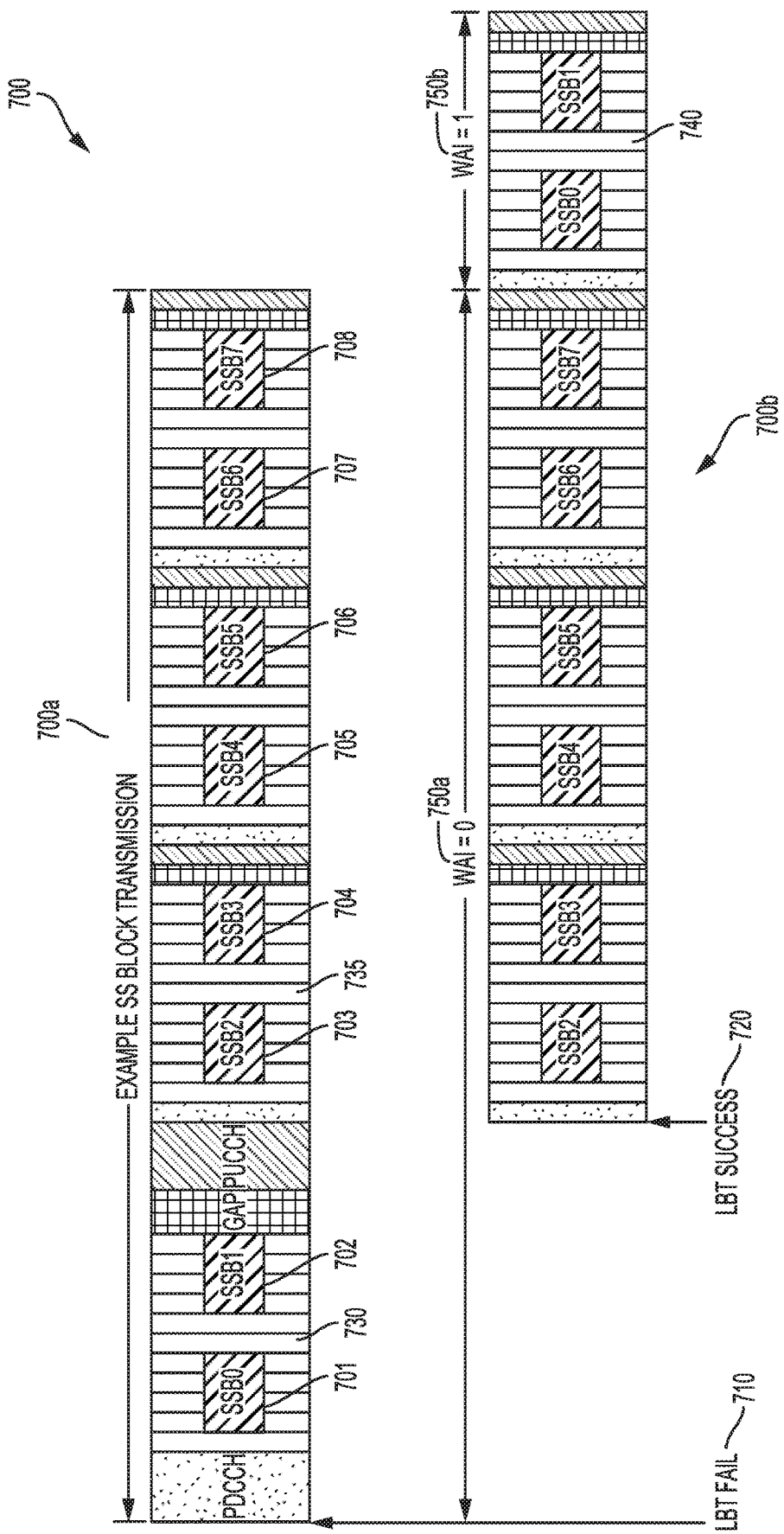
FIG. 7 illustrates an example SSB transmission pattern for SSB transmissions in a shared spectrum environment.

FIG. 7 illustrates another example SSB transmission pattern 700, in which a wrap around pattern is used by the base station 105 for SSB transmissions in a shared spectrum environment. In the illustrated example, the system configuration may correspond to configuration 440 of FIG. 4, in which a subcarrier spacing of 30 kHz is used in a frequency band between 3 GHz and 6 GHz, resulting in a SSB transmission pattern 700*a* as seen in FIG. 7. In the illustrated example, however, base station 105 operates in a shared spectrum environment and initially fails an LBT procedure 710 at slot 730 (e.g., slot 0) of the transmission pattern 700*a*. The base station 105 then succeeds in the LBT procedure 720 at the next slot 735 (e.g., slot 1) of the transmission pattern 700*a*. At this point in time, slot 730 has been missed, and accordingly, two SSB transmission opportunities 701 and 702 have been missed. In this instance, base station 105 transmits the SSBs of the remaining opportunities 703, 704, 705, 706, 707, and 708 of the DMTC window according to pattern 700*b*. After the remaining SSBs are transmitted, however, the base station 105 may then transmit the SSBs from the missed opportunities 701 and 702 at the following available slot 740 (as a follow-up transmission), as shown in FIG. 7. Accordingly, the transmitted pattern 700*b* corresponds to the original predefined pattern 700*a* except that the first two SSB transmissions 701 and 702 are not sent in the originally defined location at slot 730 due to the initial LBT failure 710 but in the following available slot 740 after the remaining SSB transmissions are sent.

In this example, the UE 115 may determine system timing information such as the symbol timing, cell ID, and initial access parameters from the PSS, SSS, and PBCH transmitted in a SSB. The UE 115, however, may not be able to determine the DMTC window or other time frame based merely on reception of an SSB with an associated SSB index (e.g., SSB0, SSB1, etc.) because the UE 115 is unable to determine whether any particular received SSB index is associated with the corresponding SSB transmission opportunity of the predefined pattern 700*a* or if it is associated with a missed SSB opportunity transmission in a following slot (e.g., slot 740).

For example, the UE 115 may receive SSB3 at a certain point in time, but it may not be able to determine whether the SSB is received as part of the pattern 700*a* or if it is a retransmission of a missed SSB opportunity (follow-up transmission) that is sent in a slot following the original pattern 700*a*. Accordingly, in some instances, the base station 105 may also transmit a wrap around index associated with each SSB transmission to indicate whether the SSB belongs to an initial transmission associated with the original pattern 700*a* or a follow-up transmission of missed SSB opportunities (e.g., in slot 740). The UE 115 may then determine the DMTC window or other time frame starting point based on the SSB index with the wrap around index 750. In the illustrated example, the received SSB3 is associated with a wrap around index 750*a* of 0, indicating SSB3 belongs to the original pattern 700*a* of SSB transmission opportunities. On the other hand, SSB0 and SSB1 are associated with wrap around index 750*b* of 1, indicating they are retransmissions of missed SSB opportunities in slot 730. Generally, a single bit may be used for the wrap around index 750, as it indicates two possibilities for an associated SSB (i.e., original pattern or follow-up transmission), while more bits could be used to indicate more possibilities for an associated SSB (i.e., original pattern or the first follow-up transmission or the second follow-up transmission or the third follow-up transmission, etc). The base station 105 may include the wrap around index 750 in the PBCH or in unused resource elements of the associated SSB.

Although FIG. 7 depicts an example of one missed slot 730 and two missed SSB transmission opportunities 701 and 702, the base station 105 may apply the same procedures discussed above with respect to any number of missed SSB transmission opportunities. The base station 105 may also obtain channel access and begin transmitting SSBs in the middle of a slot (i.e., not at a slot boundary). For example, the base station 105 may miss a first SSB transmission opportunity 701 but obtain channel access in time to transmit at the second SSB transmission opportunity 702 in the same slot 730.

Figure 8:
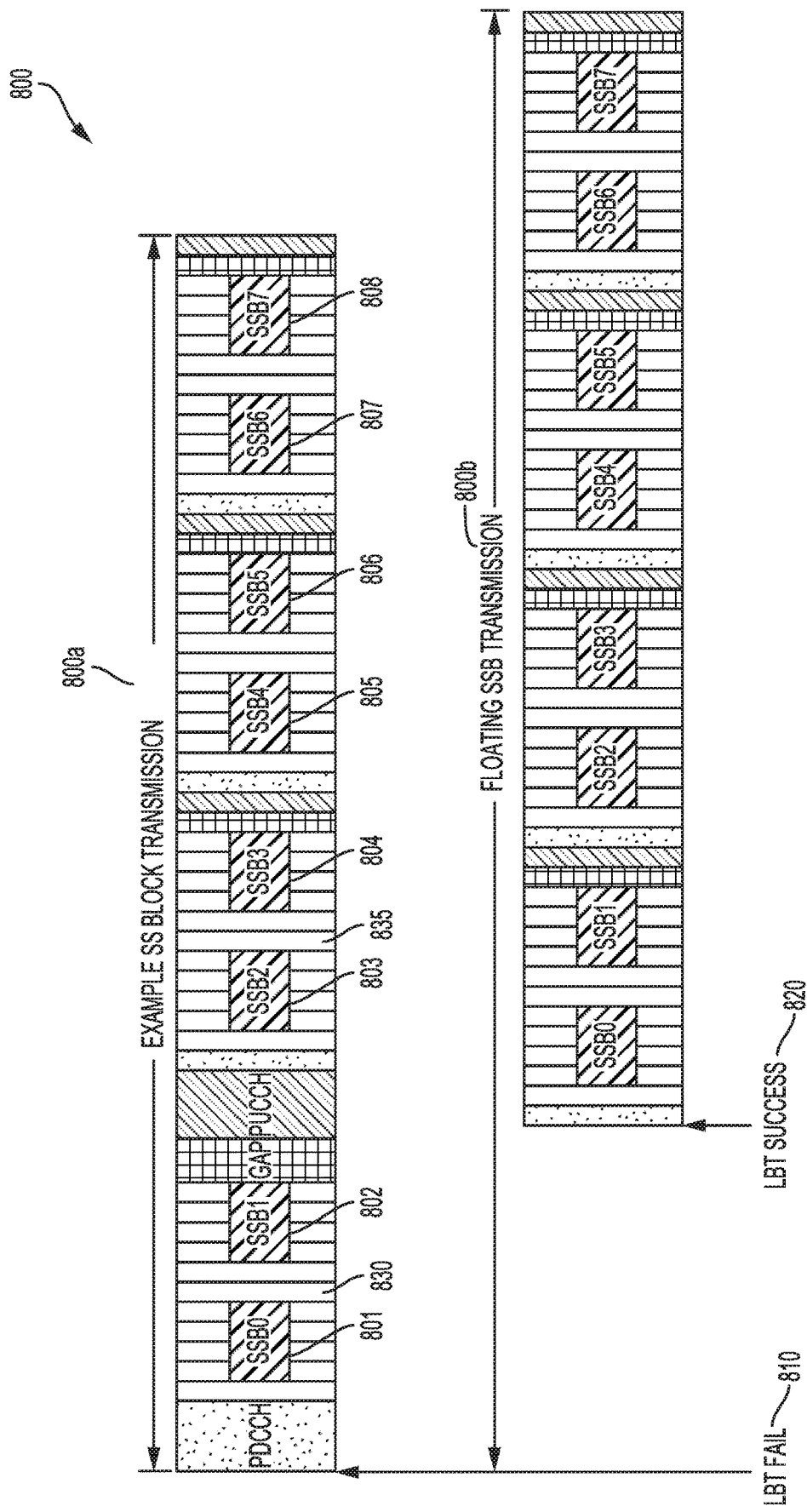
FIG. 8 illustrates an example SSB transmission pattern for SSB transmissions in a shared spectrum environment.

FIG. 8 illustrates another example SSB transmission pattern 800, in which a floating SSB transmission pattern is used by the base station 105 for SSB transmissions in a shared spectrum environment. In the illustrated example, the system configuration may correspond to configuration 440 of FIG. 4, in which a subcarrier spacing of 30 kHz is used in a frequency band between 3 GHz and 6 GHz, resulting in a SSB transmission pattern 800*a* as seen in FIG. 8. In the illustrated example, however, base station 105 operates in a shared spectrum environment and initially fails an LBT procedure 810 at slot 830 (e.g., slot 0) of the transmission pattern 800*a*. The base station 105 then succeeds in the LBT procedure 820 at the next slot 835 (e.g., slot 1) of the transmission pattern 800*a*. At this point in time, slot 830 has been missed, and accordingly, two SSB transmission opportunities 801 and 802 have been missed. In the present example, base station 105 transmits the SSBs according to the predefined pattern 800*b* but starting at the first available slot 835 instead of at the originally defined slot 830. Accordingly, the transmitted pattern 800*b* corresponds to the original predefined pattern 800*a*, with the only difference being that the starting point is different in the transmitted pattern 800*b*.

In this example, the transmitted pattern 800*b* matches the predefined pattern 800*a*, except in starting location. In such instances, the UE 115 may obtain symbol timing, cell ID, and initial access parameters from PSS, SSS, and PBCH in a SSB, but the UE 115 may not be able to determine the DMTC window or other time frame window starting location or timing due to the difference in starting location of transmission pattern 800b. Accordingly, the base station 105 may transmit a timing offset value to indicate the timing offset with respect to the starting boundary of the DMTC window (e.g., at 810). In other words, the timing offset indicates the time difference between the start of the DMTC window and the first available SSB transmission opportunity. For example, the base station 105 may obtain channel access at 820 and begin transmission of SSBs according to pattern 800b beginning at slot 835. The base station 105 may also transmit a timing offset that indicates the timing offset between the starting boundary of the DMTC window at slot 830 and the actual transmission of SSB0 (or any of the other SSBs) at the first available SSB transmission opportunity in slot 835. The UE 115 may then determine, based on the received timing offset, the starting point of the current DMTC window (which begins at slot 830 and not slot 835). The base station 105 may include the timing offset in the PBCH or in unused resource elements of the associated SSB, as described in further detail below with respect to FIG. 9.

Although FIG. 8 depicts an example of one missed slot 830 and two missed SSB transmission opportunities 801 and 802, the base station 105 may apply the same procedures discussed above with respect to any number of missed SSB transmission opportunities. The base station 105 may also obtain channel access and begin transmitting SSBs in the middle of a slot (i.e., not at a slot boundary). For example, the base station 105 may miss a first SSB transmission opportunity 801 but obtain channel access in time to transmit at the second SSB transmission opportunity 802 in the same slot 830.

Figure 9:
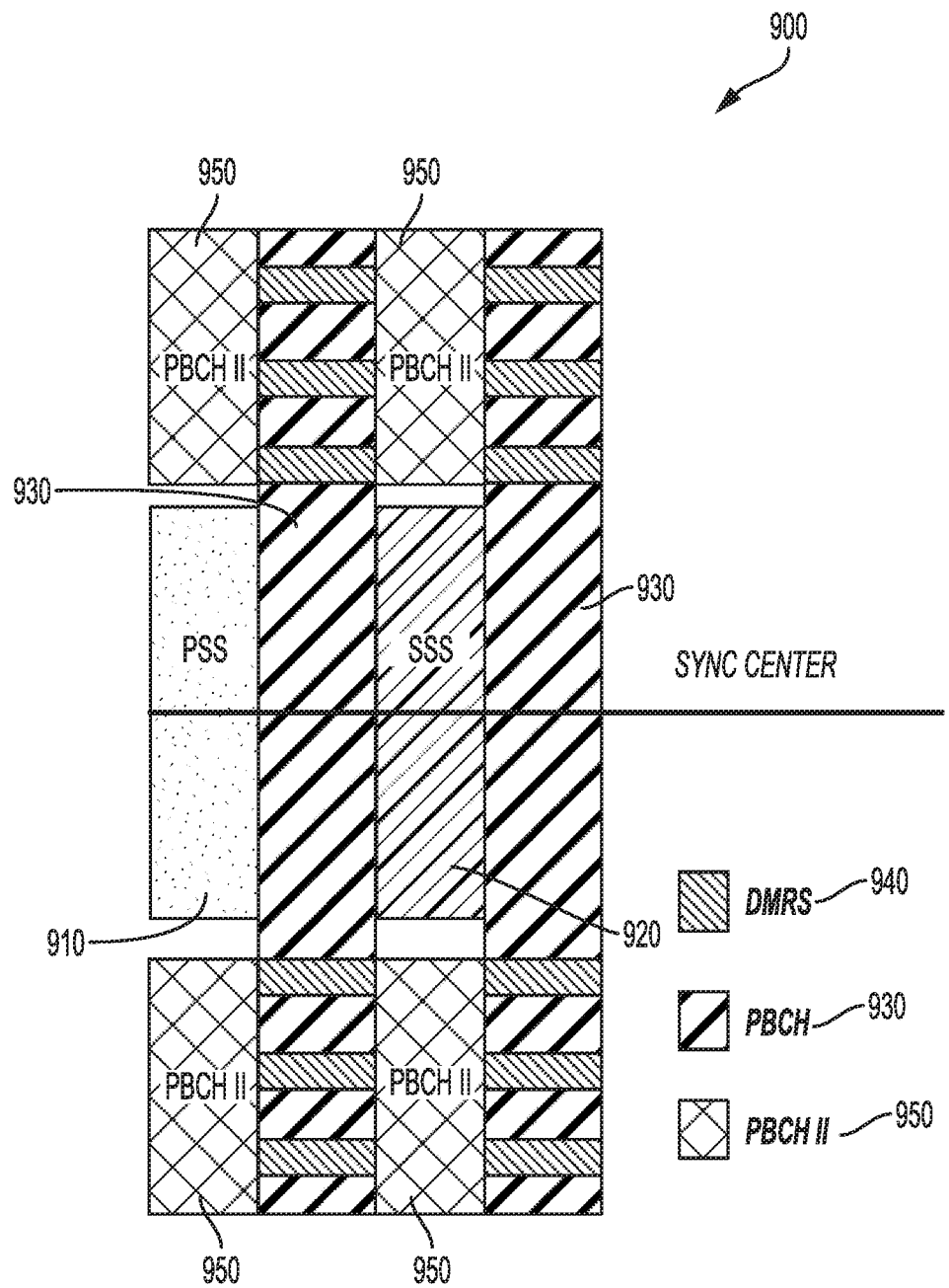
FIG. 9 illustrates an example of a synchronization signal block (SSB) structure including a secondary Physical Broadcast Channel (PBCH).

FIG. 9 illustrates an example of resources of an SSB 900 that may be used for transmission of either the wrap around index or slot offset as described above with respect to FIGS. 7 and 8. The resources depicted may correspond to a SSB 900 similar to that described above in reference to FIG. 3. For example, PSS 910 is included in a first symbol of the SSB 900, SSS 920 is included in a third symbol of the SSB 900, and PBCH 930 is included in the second and fourth symbols of the SSB 900. The PBCH 930 may also include DMRS signals 940. Because the PSS 910 and SSS 920 in the first and third symbols span 127 resource elements while the PBCH 930 spans 288 resource elements in the second and fourth symbols, there may be unused resources in the first and third symbols where PSS 910 and SSS 920 are not located. Accordingly, base station 105 may include a secondary PBCH 950 using those unused resources for transmission of the wrap around index or timing offset. In some instances, other types of information such as PLMN (public land mobile network) related information may also be included in the secondary PBCH 950. In addition, additional reference signal for deep penetration may also be conveyed via the unused resource elements.

Figure 10:
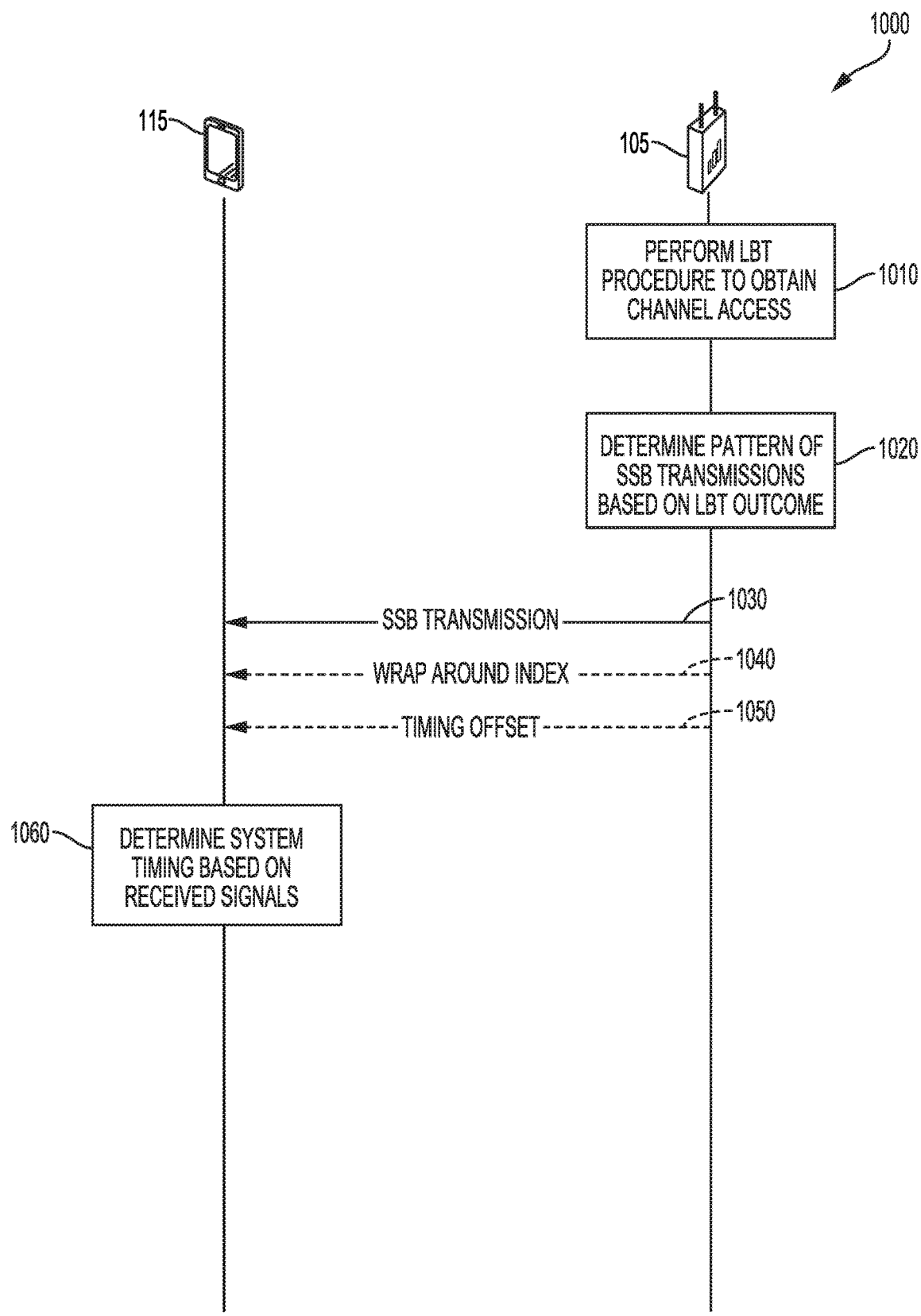
FIG. 10 illustrates an example process flow in a system that supports SSB transmission and decoding techniques.

FIG. 10 illustrates an example of a process flow 1000 in a system that supports SSB transmission and decoding techniques in accordance with aspects of the present disclosure. Process flow 1000 may include base station 105 and UE 115, which may be examples of the corresponding devices described with reference to FIGS. 1-2.

At 1010, base station 105 performs an LBT procedure to obtain channel access. Based on the outcome of the LBT procedure, the base station 105 determines a pattern of SSB transmissions at 1020. The outcome of the LBT procedure may comprise a time at which the base station 105 successfully obtains channel access. For example, the base station 105 may obtain channel access at the beginning of a DMTC window or only after one or more SSB transmission opportunities have passed. Thus, based on when channel access is obtained, the base station 105 may determine the SSB transmission pattern in accordance with procedures described herein with respect to FIGS. 6, 7, and 8, for example.

At 1030, base station 105 sends the SSB transmissions according to the determined pattern. Depending on the configuration, the base station 105 may optionally send a wrap around index at 1040 or a timing offset 1050 to facilitate system timing acquisition by the UE 115. At 1060, the UE 115 determines system timing based on the received signals, including the SSB transmission and, optionally, the wrap around index or timing offset.

Figure 11:
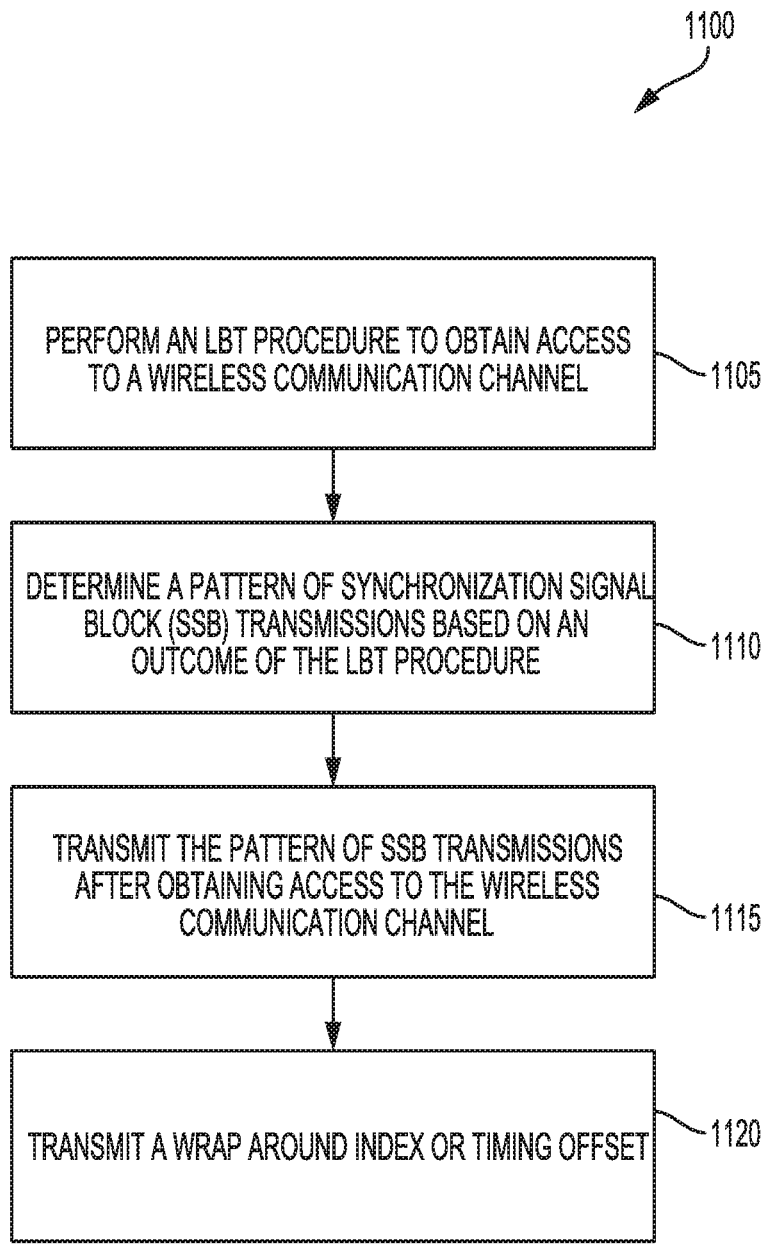
FIG. 11 illustrates a method for transmission of SSB in accordance with aspects of the present disclosure.

FIG. 11 shows a flowchart illustrating a process 1100 for SSB transmission in accordance with various aspects of the present disclosure. The operations of process 1100 may be implemented by a device such as a base station or its components as described with reference to FIGS. 1 and 2. For example, the operations of process 1100 may be performed by the processor 240, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 1105, the base station 105 performs an LBT procedure to obtain access to a wireless communication medium. At 1110, the base station 105 determines a pattern of synchronization signal block (SSB) transmissions based on an outcome of the LBT procedure as described above with reference to FIG. 6, 7, or 8. At 1115, the base station 105 transmits the pattern of SSB transmissions after obtaining access to the wireless communication channel. At 1120, the base station 105 optionally transmits a wrap around index or timing offset, depending on the configuration used for determining a pattern of SSB transmissions, and as described above with reference to FIG. 7 or 8.

Figure 12:
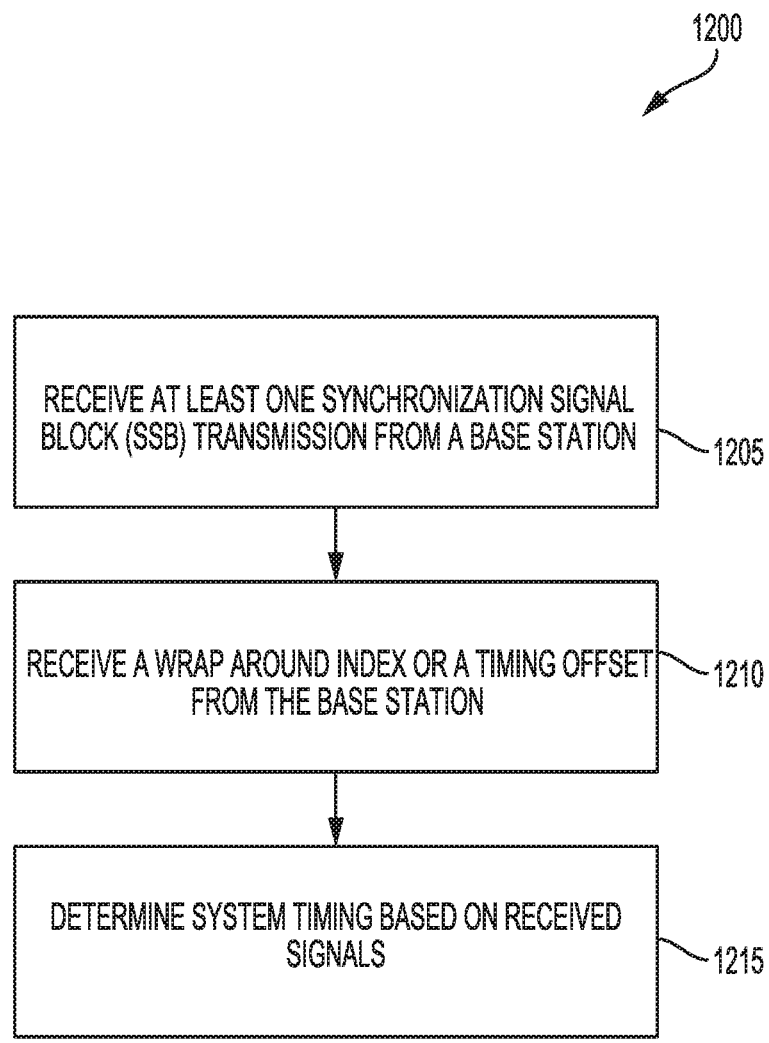
FIG. 12 illustrates a method for determining system timing in accordance with aspects of the present disclosure.

FIG. 12 shows a flowchart illustrating a process 1200 for SSB transmission in accordance with various aspects of the present disclosure. The operations of process 1200 may be implemented by a device such as a UE 115 or its components as described with reference to FIGS. 1 and 2. For example, the operations of process 1200 may be performed by the processor 280, either alone or in combination with other components, as described herein. In some examples, the UE 115 may execute a set of codes to control the functional elements of the device to perform the functions described below. Additionally or alternatively, the UE 115 may perform aspects of the functions described below using special-purpose hardware.

At 1205, the UE 115 receives at least one synchronization signal block (SSB) transmission from a base station. At 1210, the UE 115 optionally receives a wrap around index or a timing offset from the base station, depending on the configuration used for determining a pattern of SSB transmissions, and as described above with reference to FIG. 7 or 8. At 1215, the UE 115 determines system timing base on the received signals, which includes the at least one SSB transmission and other signals such as the wrap around index or timing offset, depending on the configuration.

Figure 13:
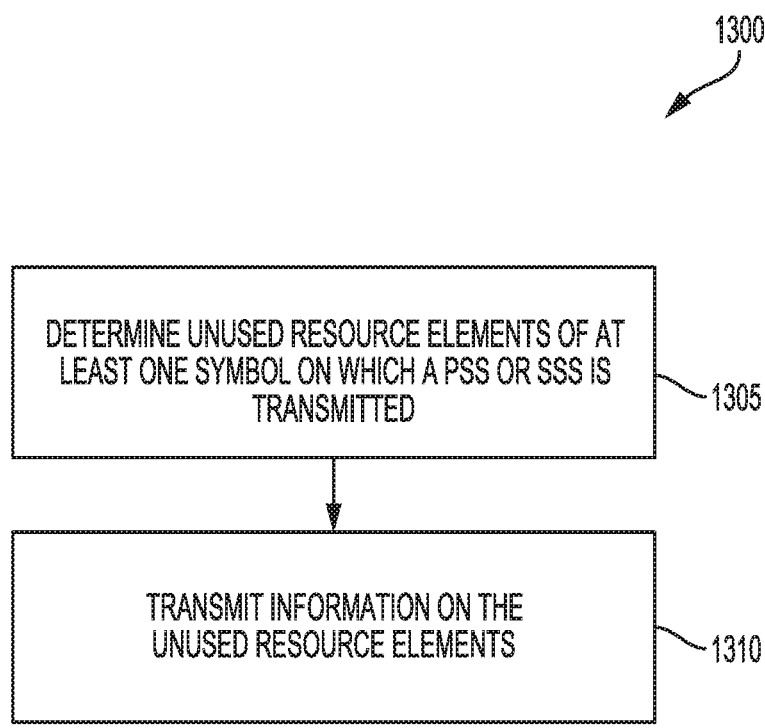
FIG. 13 illustrates a method for transmission of SSB in accordance with aspects of the present disclosure.

FIG. 13 shows a flowchart illustrating a process 1300 for SSB transmission in accordance with various aspects of the present disclosure. The operations of process 1300 may be implemented by a device such as a base station or its components as described with reference to FIGS. 1 and 2.

For example, the operations of process 1300 may be performed by the processor 240, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 1305, the base station 105 determines unused resource elements of at least one symbol on which a PSS or SSS is transmitted. In some examples, the unused resource elements may be resource elements in a SSB and used as a secondary PBCH, as described above with reference to FIG. 9. At 1310, the base station 105 transmits information on the unused resource elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
performing a Listen-Before-Talk (LBT) procedure to obtain access to a wireless communication channel;
determining, after obtaining access to the wireless communication channel, a pattern of synchronization signal block (SSB) transmissions based on an index of a SSB transmission that is to be transmitted at a next SSB transmission opportunity in a discovery reference signal (DRS) measurement timing configuration (DMTC) window, wherein each SSB transmission comprises a Physical Broadcast Channel (PBCH) multiplexed with a primary synchronization signal (PSS) and a secondary synchronization signal (SSS); and
transmitting the pattern of SSB transmissions and at least one indication to a user equipment (UE), wherein the indication comprises a first value for SSB transmissions associated with a current SSB transmission opportunity or a second value for SSB transmissions associated with a missed SSB transmission opportunity.

2. The method of claim 1, wherein access to the wireless communication channel is obtained after a missed opportunity for at least one SSB transmission in the DMTC window.

3. The method of claim 2, wherein the determining the pattern includes excluding the at least one SSB transmission from the pattern.

4. The method of claim 3, wherein the pattern includes at least one SSB transmission of at least one remaining opportunity for SSB transmissions in the DMTC window.

5. The method of claim 2, wherein the pattern includes the at least one SSB transmission associated with the missed opportunity after an SSB transmission of at least one remaining opportunity for SSB transmissions in the DMTC window.

6. The method of claim 1, wherein the indication is transmitted in a Physical Broadcast Channel (PBCH).

7. The method of claim 1, wherein the indication is transmitted in unused resource elements of at least one symbol on which a primary synchronization signal (PSS) or secondary synchronization signal (SSS) is transmitted.

8. The method of claim 2, wherein the transmitting includes transmitting SSB transmissions according to the pattern at a first available SSB transmission opportunity after the missed opportunity.

9. The method of claim 8, further comprising transmitting a timing offset to a user equipment (UE).

10. The method of claim 9, where the timing offset indicates the timing offset between the first available SSB transmission opportunity and a starting boundary of the DMTC window.

11. The method of claim 9, wherein the timing offset is transmitted in a Physical Broadcast Channel (PBCH).

12. The method of claim 9, wherein the timing offset is transmitted in unused resource elements of at least one symbol on which a primary synchronization signal (PSS) or secondary synchronization signal (SSS) is transmitted.

13. An apparatus for wireless communication, comprising:
a processor;
memory coupled to the processor; and
instructions stored in the memory and operable, when executed by the processor, to cause the apparatus to:
perform a Listen-Before-Talk (LBT) procedure to obtain access to a wireless communication channel;
determine, after obtaining access to the wireless communication channel, a pattern of synchronization signal block (SSB) transmissions based an index of a SSB transmission that is to be transmitted at a next SSB transmission opportunity in a discovery reference signal (DRS) measurement timing configuration (DMTC) window, wherein each SSB transmission comprises a Physical Broadcast Channel (PBCH) multiplexed with a primary synchronization signal (PSS) and a secondary synchronization signal (SSS); and
transmit the pattern of SSB transmissions and at least one indication to a user equipment (UE), wherein the indication comprises a first value for SSB transmissions associated with a current SSB transmission opportunity or a second value for SSB transmissions associated with a missed SSB transmission opportunity.

14. The apparatus of claim 13, wherein access to the wireless communication channel is obtained after a missed opportunity for at least one SSB transmission in the DMTC window.

15. The apparatus of claim 14, wherein the pattern includes the at least one SSB transmission associated with the missed opportunity after an SSB transmission of at least one remaining opportunity for SSB transmissions in the DMTC window.

16. The apparatus of claim 13, wherein the indication is transmitted in a Physical Broadcast Channel (PBCH).

17. The apparatus of claim 13, wherein the indication is transmitted in unused resource elements of at least one symbol on which a primary synchronization signal (PSS) or secondary synchronization signal (SSS) is transmitted.

18. The apparatus of claim 14, wherein the transmitting includes transmitting SSB transmissions according to the pattern at a first available SSB transmission opportunity after the missed opportunity.

19. The apparatus of claim 18, wherein the instructions are further executable by the processor to cause the apparatus to transmit a timing offset to a user equipment (UE).

20. The apparatus of claim 19, where the timing offset indicates the timing offset between the first available SSB transmission opportunity and a starting boundary of the DMTC window.

21. The apparatus of claim 19, wherein the timing offset is transmitted in a Physical Broadcast Channel (PBCH).

22. The apparatus of claim 19, wherein the timing offset is transmitted in unused resource elements of at least one symbol on which a primary synchronization signal (PSS) or secondary synchronization signal (SSS) is transmitted.

23. A method comprising:
receiving at least one synchronization signal block (SSB) transmission from a base station, wherein the SSB transmission comprises a Physical Broadcast Channel (PBCH) multiplexed with a primary synchronization signal (PSS) and a secondary synchronization signal (SSS);
determining an index associated with the SSB transmission;
determining a pattern of SSB transmissions based on the index;
receiving SSB transmissions of the pattern of SSB transmissions and at least one indication comprising a first value for SSB transmissions associated with a current SSB transmission opportunity or a second value for SSB transmissions associated with a missed SSB transmission opportunity; and
determining a system timing based on at least one SSB transmission of the received SSB transmissions and the at least one indication.

24. The method of claim 23, further comprising receiving a timing offset from the base station and determining the system timing based on the timing offset in addition to the received at least one SSB transmission.

25. An apparatus for wireless communication, comprising:
a processor;
memory coupled to the processor; and
instructions stored in the memory and operable, when executed by the processor, to cause the apparatus to:
receive at least one synchronization signal block (SSB) transmission from a base station, wherein the SSB transmission comprises a Physical Broadcast Channel (PBCH) multiplexed with a primary synchronization signal (PSS) and a secondary synchronization signal (SSS);
determine an index associated with the SSB transmission;
determine a pattern of SSB transmissions based on the index;
receive SSB transmissions of the pattern of SSB transmissions and at least one indication comprising a first value for SSB transmissions associated with a current SSB transmission opportunity or a second value for SSB transmissions associated with a missed SSB transmission opportunity; and
determine a system timing based on at least one SSB transmission of the received SSB transmissions and the at least one indication.

26. The apparatus of claim 25, wherein the instructions are further operable to cause the apparatus to receive a timing offset from the base station and determine the system timing based on the timing offset in addition to the received at least one SSB transmission.

27. The apparatus of claim 14, wherein the determining the pattern includes excluding the at least one SSB transmission from the pattern.

28. The apparatus of claim 27, wherein the pattern includes at least one SSB transmission of at least one remaining opportunity for SSB transmissions in the DMTC window.

29. An apparatus comprising:
means for performing a Listen-Before-Talk (LBT) procedure to obtain access to a wireless communication channel;
means for determining, after obtaining access to the wireless communication channel, a pattern of synchronization signal block (SSB) transmissions based on an index of a SSB transmission that is to be transmitted at a next SSB transmission opportunity in a discovery reference signal (DRS) measurement timing configuration (DMTC) window, wherein each SSB transmission comprises a Physical Broadcast Channel (PBCH) multiplexed with a primary synchronization signal (PSS) and a secondary synchronization signal (SSS); and
means for transmitting the pattern of SSB transmissions and at least one indication to a user equipment (UE), wherein the indication comprises a first value for SSB transmissions associated with a current SSB transmission opportunity or a second value for SSB transmissions associated with a missed SSB transmission opportunity.

30. An apparatus comprising:
means for receiving at least one synchronization signal block (SSB) transmission from a base station, wherein the SSB transmission comprises a Physical Broadcast Channel (PBCH) multiplexed with a primary synchronization signal (PSS) and a secondary synchronization signal (SSS);
means for determining an index associated with the SSB transmission;
means for determining a pattern of SSB transmissions based on the index;
means for receiving SSB transmissions of the pattern of SSB transmissions and at least one indication comprising a first value for SSB transmissions associated with a current SSB transmission opportunity or a second value for SSB transmissions associated with a missed SSB transmission opportunity; and
means for determining a system timing based on at least one SSB transmission of the received SSB transmissions and the indication.

* * * * *